United States Patent
Foege

(10) Patent No.: US 9,194,344 B1
(45) Date of Patent: Nov. 24, 2015

(54) DUAL FUEL ENGINE HAVING SELECTIVE COMPRESSION REDUCTION

(71) Applicant: Electro-Motive Diesel, Inc., LaGrange, IL (US)

(72) Inventor: Aaron Gamache Foege, Westmont, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 14/288,728

(22) Filed: May 28, 2014

(51) Int. Cl.
| | |
|---|---|
| *F02B 75/02* | (2006.01) |
| *F02M 43/04* | (2006.01) |
| *F02D 15/04* | (2006.01) |
| *F02D 19/06* | (2006.01) |

(52) U.S. Cl.
CPC ............... *F02M 43/04* (2013.01); *F02D 15/04* (2013.01); *F02D 19/0642* (2013.01)

(58) Field of Classification Search
CPC ...... F02M 43/04; F02D 15/04; F02D 19/0642
USPC ... 123/48 R, 78 R, 65 P, 65 R, 73 CB, 73 CC, 123/65 A, 90.15–90.17
See application file for complete search history.

(56) References Cited

U.S. PATENT DOCUMENTS

| | | | |
|---|---|---|---|
| 5,890,469 A | | 4/1999 | Håkansson et al. |
| 7,392,795 B2 * | | 7/2008 | Nagamine et al. ............ 123/536 |
| 7,475,659 B2 | | 1/2009 | Arnell |
| 7,481,199 B2 * | | 1/2009 | Nakamura ..................... 123/345 |
| 8,276,554 B2 * | | 10/2012 | Akihisa et al. .............. 123/48 R |
| 8,322,137 B2 * | | 12/2012 | Gallone et al. ............... 60/605.1 |
| 8,573,171 B2 | | 11/2013 | Cecur et al. |
| 2007/0095313 A1 * | | 5/2007 | Kamiyama et al. ........ 123/90.16 |
| 2012/0067309 A1 | | 3/2012 | Murai et al. |
| 2013/0152901 A1 * | | 6/2013 | Shishime et al. ........... 123/48 R |
| 2014/0209054 A1 * | | 7/2014 | Shimizu et al. ............ 123/197.3 |
| 2015/0013638 A1 * | | 1/2015 | Ishida et al. .................. 123/299 |

FOREIGN PATENT DOCUMENTS

| | | |
|---|---|---|
| DE | 102004057438 | 6/2006 |
| JP | 2008202545 | 9/2008 |

\* cited by examiner

*Primary Examiner* — Marguerite McMahon
(74) *Attorney, Agent, or Firm* — Finnegan, Henderson, Farabow, Garrett & Dunner, LLP

(57) ABSTRACT

An engine system is disclosed. The engine system may have an engine block that at least partially defines a cylinder bore, and a cylinder liner disposed within the cylinder bore. The engine system may also have at least one air intake port radially formed within the cylinder liner, a piston slidingly disposed within the cylinder liner and configured to open and close the at least one air intake port, a cylinder head configured to close off an end of the cylinder liner and form a combustion chamber, and at least one exhaust valve disposed within the cylinder head. The engine system may further have a valve actuation system configured to cyclically move the at least one exhaust valve between open and closed positions, and a variable timing device configured to selectively interrupt cyclical movement of the at least one exhaust valve to change a compression ratio of the engine system.

20 Claims, 3 Drawing Sheets

DUAL FUEL ENGINE HAVING SELECTIVE COMPRESSION REDUCTION

TECHNICAL FIELD

The present disclosure relates generally to a dual fuel engine and, more particularly, to a dual fuel engine having selective compression reduction.

BACKGROUND

Dual-fuel engines are well known in the art and combust a mixture of two different types of fuel. One exemplary dual-fuel engine combusts a mixture of liquid fuel (e.g., a diesel fuel) and gaseous fuel (e.g., natural gas). By combusting two different types of fuel, advantages of both fuels (e.g., efficiency, power, emissions, cost, etc.) can be realized. For example, diesel fuel may be more power-dense and, thus, generate a greater amount of power per volume of fuel consumed. Natural gas, however, may be more abundant and therefore less expensive than diesel fuel. In addition, natural gas may burn cleaner in some applications.

In order to realize full benefits of operating a dual-fuel engine, care should be taken to ensure proper combustion of the different fuels. That is, diesel fuel may be compression-ignited at compression ratios of about 18:1, while natural gas may ignite at compression ratios that are much lower (e.g., at about 12:1). Accordingly, when natural gas is introduced into a diesel engine having high compression ratios, pre-ignition (a.k.a., knocking) of the natural gas can occur. This pre ignition can reduce an engine's efficiency, increase noise, and/or cause damage to the engine.

An exemplary dual-fuel engine is disclosed in JP Patent 2008/202545 ("the '545 patent"). The engine includes an intake valve driving means that drives an intake valve to open and close a port of a combustion chamber. A closing of the intake valve is selectively accelerated by the intake valve driving means during operation of a premixed combustion mode, when compared to a diffusion combustion mode. This accelerated closing adjusts the compression ratio of the engine to improve heat efficiency or fuel ignitability, thereby preventing the occurrence of knocking during premixed combustion.

Although the intake valve driving means of the '545 patent may be capable of adjusting the compression ratio of a dual fuel engine, it may lack broad applicability. Specifically, because the compression ratio adjustment is achieved via accelerated closing of an intake valve, the intake valve driving means may not be useful in an engine that does not have intake valves. That is, the intake valve driving means may lack applicability in a two stroke engine. Further, by adjusting intake valve operation, it may be possible to cause an undesired increase in pressure, temperature, and/or fuel concentration within an associated intake air box or manifold that could make engine operation unstable. In addition, accelerating only the closing of a valve may not provide enough flexibility to control the compression ratio in all situations.

The engine of the present disclosure solves one or more of the problems set forth above and/or other problems in the art.

SUMMARY

In one aspect, the present disclosure is directed to an engine system. The engine system may include an engine block that at least partially defines a cylinder bore, and a cylinder liner disposed within the cylinder bore. The engine system may also include at least one air intake port radially formed within the cylinder liner, a piston slidingly disposed within the cylinder liner and configured to open and close the at least one air intake port, a cylinder head configured to close off an end of the cylinder liner and form a combustion chamber, and at least one exhaust valve disposed within the cylinder head. The engine system may further include a valve actuation system configured to cyclically move the at least one exhaust valve between open and closed positions, and a variable timing device configured to selectively interrupt cyclical movement of the at least one exhaust valve to change a compression ratio of the engine system.

In another aspect, the present disclosure is directed to a method of operating an engine. The method may include directing air radially into a combustion chamber, selectively injecting gaseous fuel into the cylinder liner, and selectively injecting liquid fuel into the combustion chamber. The method may also include igniting a mixture of gaseous and liquid fuels within the combustion chamber to move a piston and produce mechanical power. The method may further include cyclically moving an exhaust valve to relieve charge from the combustion chamber, and selectively interrupting cyclical movement of the exhaust valve to adjust a compression ratio of the engine based on the mixture of gaseous and liquid fuels.

DETAILED DESCRIPTION

Figure 1:
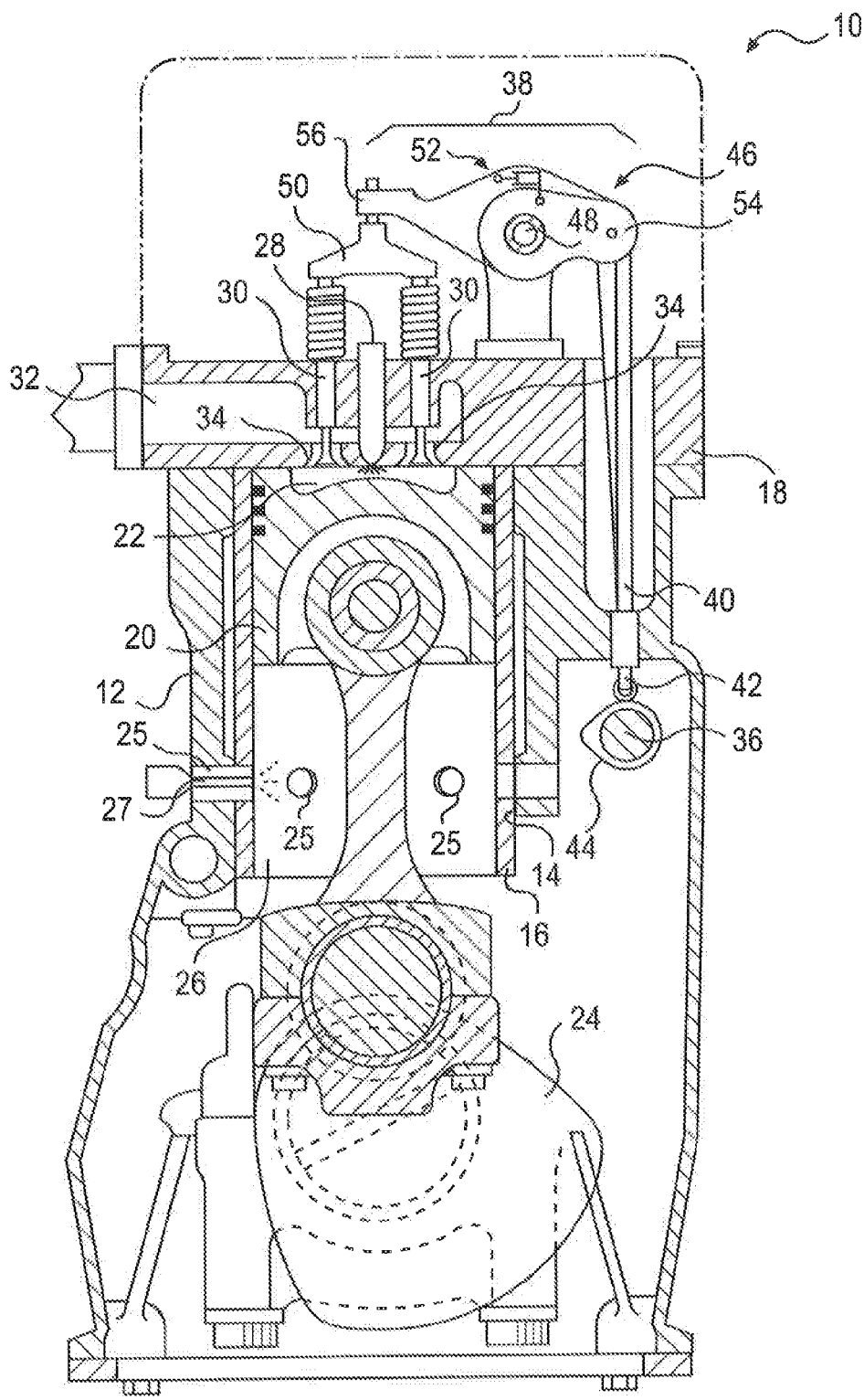
FIGS. 1 and 2 are cross-sectional end-view illustrations of an exemplary disclosed engine system.

FIG. 1 illustrates a portion of an exemplary internal combustion engine 10. Engine 10 is a two-stroke dual fuel (e.g., a compression ignition fuel such as diesel, and a gaseous fuel such as natural gas) engine having, among other things, an engine block 12 defining at least one cylinder bore 14. A cylinder liner 16 may be disposed within cylinder bore 14, and a cylinder head 18 may be connected to engine block 12 to close off an end of cylinder bore 14. A piston 20 may be slidably disposed within cylinder liner 16, and piston 20 together with cylinder liner 16 and cylinder head 18 may define a combustion chamber 22. It is contemplated that engine 10 may include any number of combustion chambers 22 and that combustion chambers 22 may be disposed in an "in-line" configuration, in a "V" configuration, in an opposing-piston configuration, or in any other suitable configuration.

Piston 20 may be configured to reciprocate within cylinder liner 16 between a top-dead-center (TDC) position and a bottom-dead-center (BDC) position. In particular, piston 20 may be pivotally connected to a crankshaft 24, which is rotatably disposed within engine block 12, so that a sliding motion of each piston 20 within cylinder liner 16 results in a rotation of crankshaft 24. Similarly, a rotation of crankshaft 24 may result in a sliding motion of piston 20. As crankshaft 24 rotates through about 180°, piston 20 may move through two full strokes (i.e., from TDC to BDC to TDC). Engine 10 (as a two-stroke engine) may undergo a complete combustion cycle within this time that includes a power/exhaust/intake stroke (TDC to BDC) and an intake/compression stroke (BDC to TDC).

During a final phase of the intake stroke, air may be drawn and/or forced into combustion chamber 22 via one or more intake ports 25 located within an annular surface 26 of cylinder liner 16. In particular, as piston 20 moves downward within cylinder liner 16, a position will eventually be reached at which intake ports 25 are no longer blocked by piston 20 and instead are fluidly communicated with combustion chamber 22. When intake ports 25 are in fluid communication with combustion chamber 22 and a pressure of air at intake ports 25 is greater than a pressure within combustion chamber 22, air will pass through intake ports 25 into combustion chamber 22.

Gaseous fuel (e.g., natural gas) may be mixed with the air before, during, and/or after the air enters combustion chamber 22. In the disclosed embodiment, a single radial fuel injector 27 is shown as being associated with one of intake ports 25 (i.e., to inject gaseous fuel through the corresponding port 25). It is contemplated however, that any number of injectors 27 may be utilized, and that injectors 27 may be disposed within air intake ports 25 or located elsewhere within engine 10, as desired. The gaseous fuel from injector 27 may mix with the air from intake ports 25 to form a fuel/air mixture within combustion chamber 22.

During the beginning of the compression stroke described above, air may still be entering combustion chamber 22 via intake ports 25 as piston 20 starts its upward stroke to mix any residual gas with air and fuel in combustion chamber 22. Eventually, intake ports 25 may be blocked by piston 20, and further upward motion of piston 20 may compress the mixture. As the mixture within combustion chamber 22 is compressed, the mixture will increase in pressure and temperature. At a point near the end of the upward piston stroke, a liquid fuel injector 28 may axially inject a quantity of high-pressure liquid fuel (e.g., diesel fuel, DME, heavy fuel, or another compression ignition fuel). This injection may initiate combustion of the air/fuel mixture already inside of combustion chamber 22, resulting in a sudden release of chemical energy. This release may result in a further and significant increase in the pressure and temperature within combustion chamber 22.

After piston 20 reaches TDC, the increased pressure caused by combustion may force piston 20 downward, thereby imparting mechanical power to crankshaft 24. During a return of piston 20 (i.e., during the ensuing upward movement of the exhaust stroke), one or more exhaust valves 30 located within cylinder head 18 may open to allow pressurized exhaust within combustion chamber 22 to exit into an associated exhaust manifold 32 via corresponding exhaust ports 34. In particular, as piston. 20 moves upward within cylinder liner 16, a position will eventually be reached at which exhaust valves 30 move to fluidly communicate combustion chamber 22 with exhaust ports 34. When combustion chamber 22 is in fluid communication with exhaust ports 34 and a pressure in combustion chamber 22 is greater than a pressure at exhaust ports 34, exhaust will pass from combustion chamber 22 through exhaust ports 34 into exhaust manifold 32.

Figure 2:
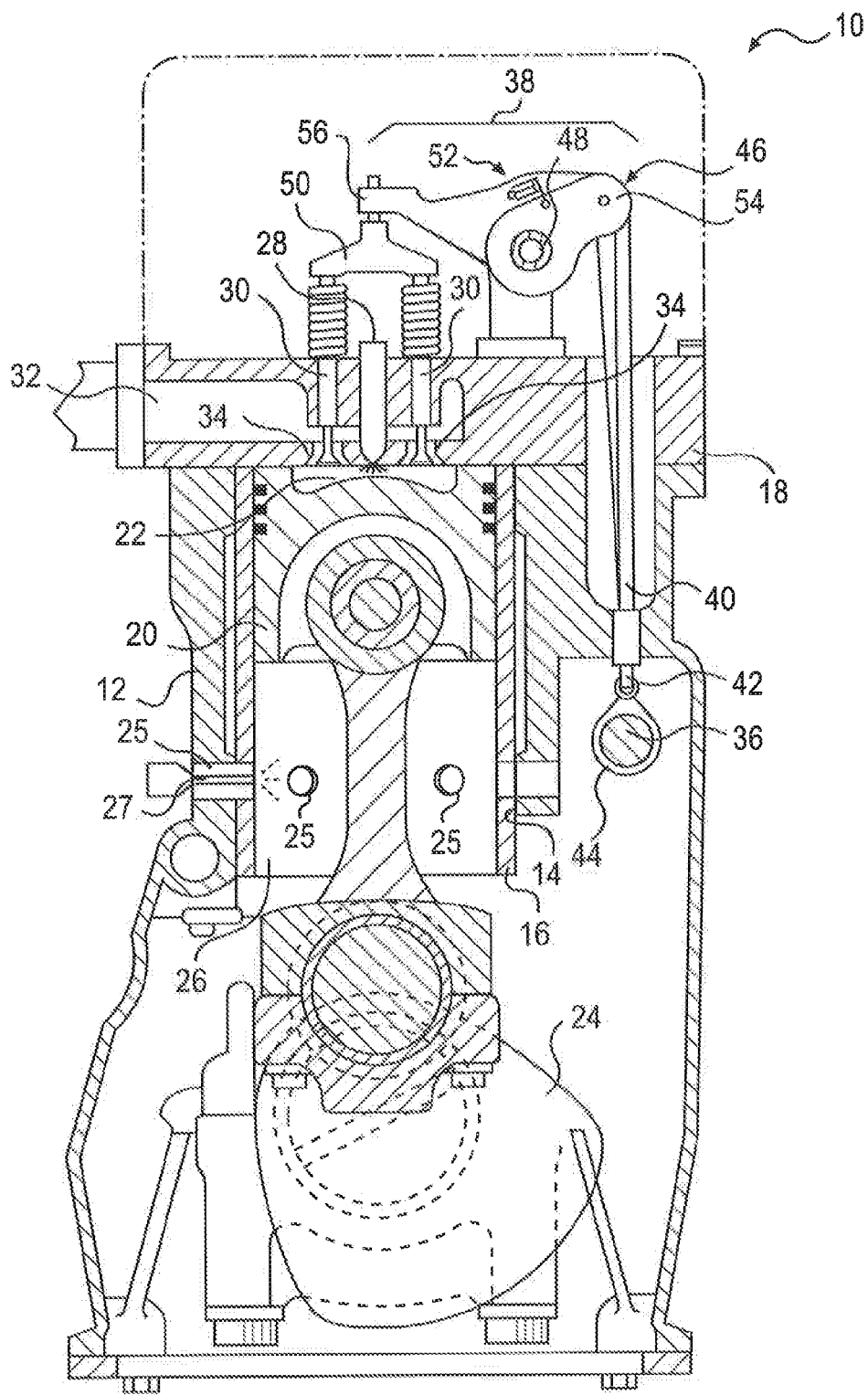

In the disclosed embodiment, movement of exhaust valve(s) 30 may be cyclically controlled, for example by way of a cam 36 that is mechanically connected to crankshaft 24. In particular, crankshaft 24 may be rotatably connected to cam 36 by a gear train, belt, or chain (not show), and cam 36 may, in turn, be connected to exhaust valves 30 by way of an actuation assembly 38. In the exemplary actuation assembly 38 shown in FIGS. 1 and 2, a push rod 40 is connected at one end to a roller 42 that rides on a lobe 44 of cam 36, and at an opposing end to a rocker arm 46. Rocker arm 46 may be configured to pivot about a point 48 when lifted by the motion of can 36 via pushrod 40, and push down on exhaust valves 30 via a bridge 50. In this way, a rotation of crankshaft 24 can be translated into a cyclical lifting movement of exhaust valves 30 at a particular timing relative to the motion of piston 20. It is contemplated that actuation assembly 38 may have another configuration, if desired.

As will be described in more detail below, it may be advantageous to selectively alter the timing at which exhaust valves 30 are opened relative to the movement of crankshaft 24 and piston 20. In particular, the timing at which exhaust valves 30 open and close may dictate a pressure and/or a temperature subsequently generated within combustion chamber 22 by the upward movement of piston 20. And in some applications, the pressure and/or temperature may be great enough to cause premature ignition of the air/fuel mixture in combustion chamber 22. Premature ignition can result in inefficiency, noise, and/or damage to engine 10. Accordingly, in some applications, a variable timing device (VTD) 52 may be used to selectively reduce a compression ratio of piston 20, such that premature ignition is inhibited.

In the disclosed embodiment, VTD 52 is a lost-motion mechanism configured to change operation of rocker arm 46. Specifically, rocker arm 46 may include two opposing arms 54, 56 that are pinned to each other at pivot point 48. Arm 54 may engage push rod 40, while arm 56 engages bridge 50. Both arms 54, 56 may be free to pivot somewhat independently about point 48, and VTD 52 may limit the range of free pivoting. For example, VTD 52, when locked in a first position (shown in FIG. 1), may rigidly connect arm 54 to arm 56, such that all movement of pushrod 40 is directly transmitted to bridge 50. But when VTD 52 is locked in a second position (shown in FIG. 2), arm 54 may be allowed to freely pivot through a desired range before engaging VTD 52 and transferring motion to arm 56. In other words, when VTD 52 is in the second position, some motion of push rod 40 may be lost during the time that arm 54 freely pivots. It is contemplated that VTD 52 may only have two discrete positions or, alternatively, any number of positions between the first and second positions.

VTD 52 may take any lost motion configuration known in the art. In the disclosed embodiment, however, VTD 52 is a hydraulic piston connected at one end to arm 54 and at another end to arm 56. When completely filed with pressurized fluid, the piston becomes hydraulically locked in the first position, thereby locking any motion of arm 54 to a corresponding motion of arm 56. When partially filled (or not filled at all), some motion of arm 54 may be lost and not transferred to arm 56. That is, arm 54 may be able to pivot through a range of angles limited by the amount of fluid in the piston of VTD 52 before engaging VTD 52 and transferring motion to arm 56.

Figure 3:
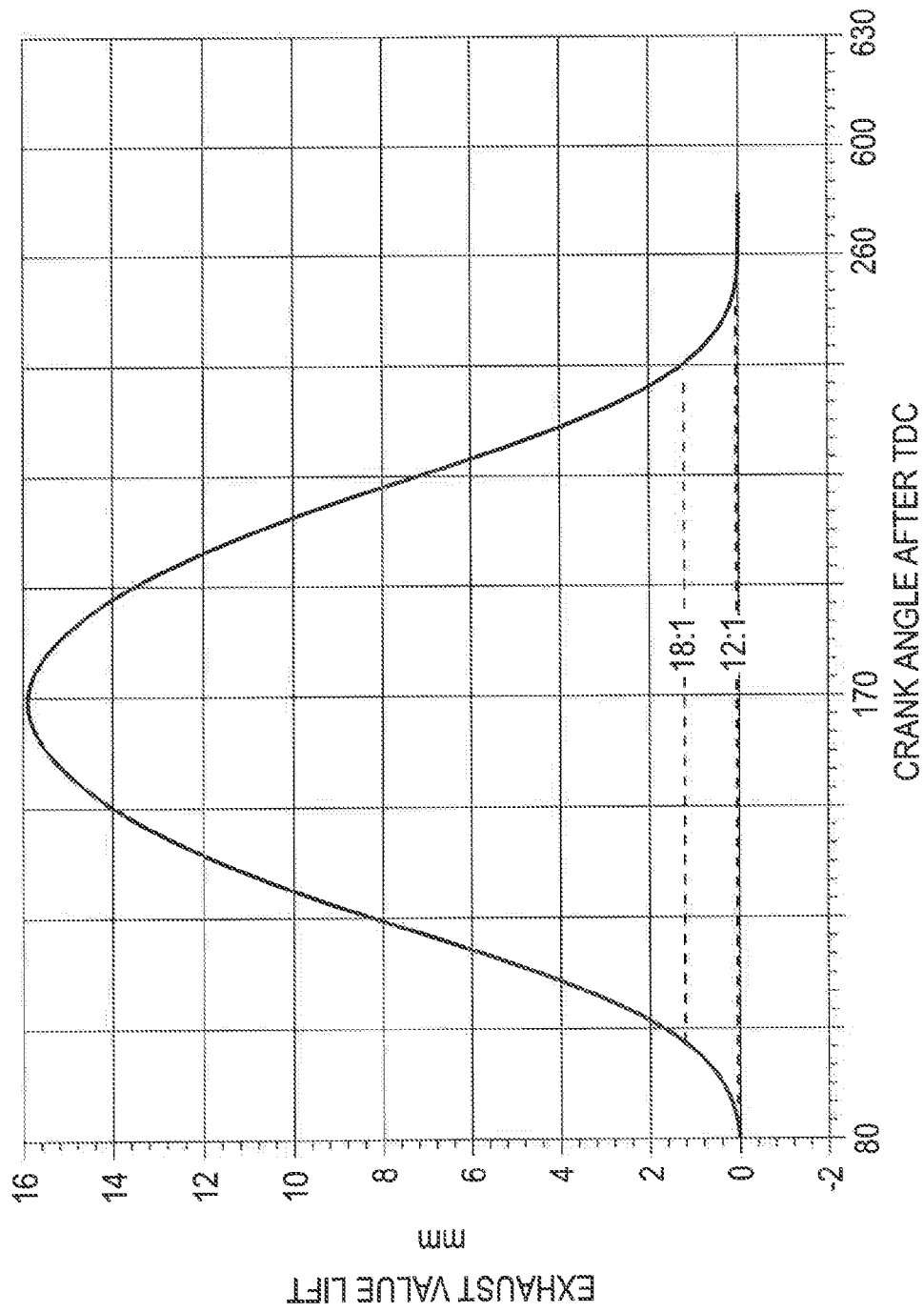
FIG. 3 is an exemplary disclosed timing chart associated with the engine system of FIGS. 1 and 2.

An exemplary timing chart associated with engine 10 is shown in FIG. 3. This chart will be discussed in more detail below to further illustrate the disclosed concepts.

INDUSTRIAL APPLICABILITY

The disclosed engine system may be used in any machine or power system application where it is beneficial to reduce emissions of harmful gases, while also delivering inexpensive power. The disclosed engine system finds particular applicability within mobile machines, such as within locomotives, which can be subjected to large variations in load and emissions requirements. The disclosed engine system may provide an efficient way to selectively deliver gaseous fuel known to produce lower levels of regulated exhaust emissions, liquid fuel known to produce greater amounts of power, and/or mixtures of gaseous fuel and liquid fuel.

The timing chart of FIG. 3 illustrates the opening and closing of exhaust valves 30 relative to a rotation angle of crankshaft 24. When operating using primarily liquid fuel, exhaust valves 30 may open at about 100° after TDC and close at about 240° after TDC. VTD 52 may be locked in the second position to achieve this timing and, at this timing, the motion of piston 20 may result in a compression ratio of about 18:1. As described above, this compression ratio may be sufficient to compression ignite the injected liquid fuel. However, if gaseous fuel or a mixture of gaseous fuel and liquid fuel were to be introduced into combustion chamber 22, the compression ratio could cause the fuel to ignite prematurely.

The timing chart of FIG. 3 also illustrates the opening and closing of exhaust valves 30 that can selectively be used during gaseous fuel operation. When operating using primarily gaseous fuel, exhaust valves 30 may open at an earlier timing of about 80° after TDC and close at an extended timing of about 260° after top dead center. VTD 52 may be locked in the first position to achieve this timing and, at this timing, the motion of piston 20 may result in a compression ratio of about 12:1. Specifically, by opening exhaust valves 30 earlier and closing exhaust valves 30 later, a greater amount of charge within combustion chamber 22 may be released into exhaust manifold 32 and not be compressed by piston 20. Accordingly, by releasing more charge into exhaust manifold 32, a pressure within combustion chamber 22 may be lower. As described above, this compression ratio may be sufficient to compress the gaseous fuel without causing pre-ignition.

When operating engine 10 using a mixture of gaseous and liquid fuels, the timing of exhaust valves 30 should be controlled to produce a compression ratio somewhere between 18:1 and 12:1, depending on the mixture. Ideally, engine 10 should be caused to have the highest compression ratio possible, without causing pre-ignition of the gaseous fuel. Thus, for a greater concentration of liquid fuel, a higher compression ratio should be implemented. And for a greater concentration of gaseous fuel, a lower compression ratio should be implemented. This compression ratio may be set to a desired level by selectively filling the piston of VTD 52 with varying amounts of pressurized fluid, thereby causing varying amounts of the motion of push rod 40 to be lost and exhaust valves 30 to consequently be opened and closed at different times.

Care should be taken when transitioning between liquid fuel operation at higher compression ratios and gaseous fuel operation at lower compression ratios. For example, the transition should be generally smooth and linear, such that operation of the engine is not significantly impacted. In one embodiment, the transition may be made over multiple engine cycles (e.g., over about five cycles or during about one second of engine operation), with the timing changing no more than about 2°/cycle. In this manner, the power output and stability of engine 10 may be maintained.

In some embodiments, it may be possible to vary the opening and closing timings of exhaust valves 30 independently. Specifically, it may be possible to cause VTD 52 to move between the first and second positions while exhaust valves 30 are open. This may allow for exhaust valve 30 to open at a conventional timing and close early, or open late and close at a conventional timing. And doing so may provide finer control over the compression ratio of combustion chamber 22. It may also be possible to vary the opening and/or closing timings of one exhaust valve 30 associated with one combustion chamber 22 separately and independently of another exhaust valve associated with a different combustion chamber 22. This may allow for even finer control over engine operation.

The disclosed system may be applicable to any type of dual fuel engine, including both two and four-stroke engines. In addition, by releasing charge from combustion chamber 22 into exhaust manifold 32 via exhaust ports 34 (as opposed to through intake ports 25), control over intake air pressure, temperature, and fuel concentration may be maintained. The disclosed system may also allow for fine adjustments to valve opening and closing times, which may provide for greater flexibility in engine control.

It will be apparent to those skilled in the art that various modifications and variations can be made to the disclosed engine systems without departing from the scope of the disclosure. Other embodiments of the engine systems will be apparent to those skilled in the art from consideration of the specification and practice of the engine systems disclosed herein. For example, the disclosed embodiment of VTD 52 is exemplary only. Other "lost motion" actuators may be paired with exhaust valves 30 to achieve the desired opening and closing timings described above. It is intended that the specification and examples be considered as exemplary only, with a true scope of the disclosure being indicated by the following claims and their equivalents.

What is claimed is:

1. An engine system, comprising:
an engine block at least partially defining a cylinder bore;
a cylinder liner disposed within the cylinder bore;
at least one air intake port radially formed within the cylinder liner;
a piston slidingly disposed within the cylinder liner and configured to open and close the at least one air intake port;
a cylinder head configured to close off an end of the cylinder liner to form a combustion chamber;
at least one exhaust valve disposed within the cylinder head;
a valve actuation system configured to cyclically move the at least one exhaust valve between open and closed positions; and
a variable timing device configured to selectively interrupt cyclical movement of the at least one exhaust valve to change a compression ratio of the engine system.

2. The engine system of claim 1, further including:
a gaseous fuel injector configured to inject gaseous fuel into the combustion chamber; and
a liquid fuel injector configured to inject liquid fuel into the combustion chamber.

3. The engine system of claim 2, wherein:
the gaseous fuel injector is configured to inject gaseous fuel radially into the combustion chamber through the at least one air intake port; and
the liquid fuel injector is configured to inject liquid fuel axially into the combustion chamber.

4. The engine system of claim 2, wherein the variable timing device is configured to change a compression ratio of the engine system based on a mixture of fuels being injected into the combustion chamber.

5. The engine system of claim 4, wherein the variable timing device is configured to cause the at least one exhaust valve to open at about 100° after TDC of the piston and to close at about 240° after TDC of the piston when only liquid fuel is being injected.

6. The engine system of claim 5, wherein the variable timing device is configured to cause the at least one exhaust valve to open at about 80° after TDC of the piston and to close at about 260° after top dead center of the piston when only gaseous fuel is being injected.

7. The engine system of claim 6, wherein the variable timing device is configured to transition from a first timing associated with gaseous fuel only operation to a second timing associated with liquid fuel only operation at a rate of about 2°/cycle.

8. The engine system of claim 7, wherein the piston moves through two strokes to complete an entire cycle.

9. The engine system of claim 3, wherein the variable timing device is configured to cause the at least one exhaust valve to open at about 80° after TDC of the piston and to close at about 260° after top dead center of the piston when only gaseous fuel is being injected.

10. The engine system of claim 3, wherein the variable timing device is configured to cause a compression ratio of about 12:1 when only gaseous fuel is being injected.

11. The engine system of claim 10, wherein the variable timing device is configured to cause a compression ratio of about 18:1 when only liquid fuel is being injected.

12. The engine system of claim 3, wherein the variable timing device is configured to cause a compression ratio of about 18:1 when only liquid fuel is being injected.

13. The engine system of claim 1, wherein the variable timing device includes a rocker arm operatively associated with the at least one exhaust valve, and a hydraulic piston configured to selectively lock pivoting of opposing ends of the rocker arm.

14. The engine system of claim 1, wherein:
the engine block defines a plurality of cylinder bores;
the cylinder head is a first cylinder head associated with a first of the plurality of cylinder bores;
the engine system further includes a second cylinder bore associated with a second of the plurality of cylinder bores;
the at least one exhaust valve includes at least a first exhaust valve associated with the first cylinder head, and at least a second exhaust valve associated with the second cylinder head;
the variable timing device is a first variable timing device associated with the at least a first exhaust valve;
the engine system further includes a second variable timing device associated with the at least a second exhaust valve, and the second variable timing device is configured to selectively interrupt cyclical movement of the at least a second exhaust valve at a different timing than the first variable timing device interrupts cyclical movement of the at least a first exhaust valve.

15. An engine system, comprising:
an engine block at least partially defining a cylinder bore;
a cylinder liner disposed within the cylinder bore;
a plurality of air intake ports radially formed within the cylinder liner;
a piston slidingly disposed within the cylinder liner and configured to open and close the plurality of air intake ports;
a cylinder head configured to close off an end of the cylinder liner to form a combustion chamber;
a gaseous fuel injector configured to radially inject gaseous fuel into the combustion chamber;
a liquid fuel injector configured to axially inject liquid fuel into the combustion chamber;
at least one exhaust valve disposed within the cylinder head;
a rocker arm configured to open and close the at least one exhaust valve;
a valve actuation system configured to cyclically move the rocker arm; and
a lost motion device associated with the rocker arm and configured to selectively interrupt cyclical movement of the at least one exhaust valve to change a compression ratio of the engine system from about 12:1 to about 18:1 based on a mixture of liquid and gaseous fuels being injected into the combustion chamber.

16. The engine system of claim 15, wherein:
the lost motion device is configured to cause the at least one exhaust valve to open at about 100° after TDC of the piston and to close at about 240° after TDC of the piston when only gaseous fuel is being injected;
the lost motion device is configured to cause the at least one exhaust valve to open at about 80° after TDC of the piston and to close at about 260° after top dead center of the piston when only liquid fuel is being injected; and
the lost motion device is configured to transition from a first timing associated with gaseous fuel only operation to a second timing associated with liquid fuel only timing at a rate of about 2°/cycle.

17. A method of operating an engine;
directing air radially into a combustion chamber;
selectively injecting gaseous fuel into the combustion chamber;
selectively injecting liquid fuel into the combustion chamber;
igniting a mixture of gaseous and liquid fuels within the combustion chamber to move a piston and produce mechanical power;
cyclically moving an exhaust valve to relieve charge from the combustion chamber; and
selectively interrupting cyclical movement of the exhaust valve to adjust a compression ratio of the engine based on the mixture of gaseous and liquid fuels.

18. The method of claim 17, wherein cyclically moving the exhaust valve includes opening the exhaust valve at about 100° after TDC of the piston and closing the exhaust valve at about 240° after TDC of the piston when only liquid fuel is being injected.

19. The method of claim 18, wherein selectively interrupting the cyclical movement of the exhaust valve includes opening the exhaust valve at about 800° after TDC of the piston and closing the exhaust valve at about 260° after TDC of the piston when only gaseous fuel is being injected.

20. The method of claim 19, further including transitioning from a first timing associated with gaseous fuel only operation to a second timing associated with liquid fuel only operation at a rate of about 2°/cycle.

* * * * *